United States Patent
Fishman et al.

(10) Patent No.: US 10,419,817 B2
(45) Date of Patent: *Sep. 17, 2019

(54) SMART PLAYLIST

(71) Applicant: OpenTV, Inc., San Francisco, CA (US)

(72) Inventors: Alex Fishman, San Francisco, CA (US); Crx K. Chai, Oakland, CA (US)

(73) Assignee: OPENTV, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/637,561

(22) Filed: Jun. 29, 2017

(65) Prior Publication Data

US 2018/0020255 A1  Jan. 18, 2018

Related U.S. Application Data

(63) Continuation of application No. 12/877,034, filed on Sep. 7, 2010, now Pat. No. 9,699,503.

(51) Int. Cl.
*H04N 21/25* (2011.01)
*H04N 21/442* (2011.01)
(Continued)

(52) U.S. Cl.
CPC ..... *H04N 21/44204* (2013.01); *H04N 21/252* (2013.01); *H04N 21/4668* (2013.01); *H04N 21/4826* (2013.01)

(58) Field of Classification Search
CPC ........... G06F 17/3002; G06F 17/30035; G06F 17/30038; H04N 21/252; H04N 21/4668; H04N 21/4788
See application file for complete search history.

(56) References Cited

U.S. PATENT DOCUMENTS

| 4,718,107 A | 1/1988 | Hayes et al. |
| 4,769,697 A | 9/1988 | Gilley et al. |

(Continued)

FOREIGN PATENT DOCUMENTS

| AU | 201101152 | 10/2011 |
| EP | 0262757 A2 | 4/1988 |

(Continued)

OTHER PUBLICATIONS

"U.S. Appl. No. 12/877,993, Non Final Office Action dated Dec. 15, 2017", 36 pgs.

(Continued)

*Primary Examiner* — Nathan J Flynn
*Assistant Examiner* — Tung T Trinh
(74) *Attorney, Agent, or Firm* — Schwegman Lundberg & Woessner, P.A.

(57) ABSTRACT

A smart playlist system is described. In one example embodiment, a collector module obtains content utilization data from a plurality of client devices associated with respective plurality of viewers. A hot list generator module generates a list of popular content items based on the obtained content utilization data. A customization module generates a customized playlist for a target viewer from the plurality of viewers, based on the list of popular content items and a profile of the target viewer. The communications module communicates the customized playlist to a client device of the target viewer.

20 Claims, 5 Drawing Sheets

(51) Int. Cl.
*H04N 21/466* (2011.01)
*H04N 21/482* (2011.01)

(56) References Cited

U.S. PATENT DOCUMENTS

| | | |
|---|---|---|
| 4,907,079 A | 3/1990 | Turner et al. |
| 4,930,160 A | 5/1990 | Vogel |
| 4,931,865 A | 6/1990 | Scarampi |
| 5,019,899 A | 5/1991 | Boles et al. |
| 5,034,807 A | 7/1991 | Von Kohorn |
| 5,068,733 A | 11/1991 | Bennett |
| 5,099,322 A | 3/1992 | Gove |
| 5,227,874 A | 7/1993 | Von Kohorn |
| 5,264,933 A | 11/1993 | Rosser et al. |
| 5,283,639 A | 2/1994 | Esch et al. |
| 5,353,392 A | 10/1994 | Luquet et al. |
| 5,373,315 A | 12/1994 | Dufresne et al. |
| 5,382,983 A | 1/1995 | Kwoh et al. |
| 5,410,326 A | 4/1995 | Goldstein |
| 5,467,288 A | 11/1995 | Fasciano et al. |
| 5,483,276 A | 1/1996 | Brooks et al. |
| 5,497,185 A | 3/1996 | Dufresne et al. |
| 5,508,731 A | 4/1996 | Kohorn |
| 5,515,485 A | 5/1996 | Luquet et al. |
| 5,524,193 A | 6/1996 | Covington et al. |
| 5,543,856 A | 8/1996 | Rosser et al. |
| 5,546,471 A | 8/1996 | Merjanian |
| 5,579,002 A | 11/1996 | Igguiden et al. |
| 5,583,980 A | 12/1996 | Anderson |
| 5,590,262 A | 12/1996 | Isadore-Barreca |
| 5,600,368 A | 2/1997 | Matthews, III |
| 5,600,775 A | 2/1997 | King et al. |
| 5,603,078 A | 2/1997 | Henderson et al. |
| 5,604,896 A | 2/1997 | Duxbury et al. |
| 5,613,909 A | 3/1997 | Stelovsky |
| 5,614,940 A | 3/1997 | Cobbley et al. |
| 5,621,454 A | 4/1997 | Ellis et al. |
| 5,627,936 A | 5/1997 | Prasad et al. |
| 5,631,903 A | 5/1997 | Dianda et al. |
| 5,635,989 A | 6/1997 | Rothmuller |
| 5,652,615 A | 7/1997 | Bryant et al. |
| 5,655,144 A | 8/1997 | Milne et al. |
| 5,661,516 A | 8/1997 | Caries |
| 5,663,756 A | 9/1997 | Blahut et al. |
| 5,664,046 A | 9/1997 | Abecassis |
| 5,675,511 A | 10/1997 | Prasad et al. |
| 5,680,639 A | 10/1997 | Milne et al. |
| 5,708,845 A | 1/1998 | Wistendahl et al. |
| 5,715,014 A | 2/1998 | Perkins et al. |
| 5,724,472 A | 3/1998 | Abecassis |
| 5,727,141 A | 3/1998 | Hoddie et al. |
| 5,740,549 A | 4/1998 | Reilly et al. |
| 5,758,257 A | 5/1998 | Herz et al. |
| 5,758,259 A | 5/1998 | Lawler |
| 5,765,164 A | 6/1998 | Prasad et al. |
| 5,771,307 A | 6/1998 | Lu et al. |
| 5,774,664 A | 6/1998 | Hidary et al. |
| 5,774,666 A | 6/1998 | Portuesi |
| 5,793,409 A | 8/1998 | Tetsumura |
| 5,794,210 A | 8/1998 | Goldhaber et al. |
| 5,798,785 A | 8/1998 | Hendricks et al. |
| 5,801,747 A | 9/1998 | Bedard |
| 5,818,510 A | 10/1998 | Cobbley et al. |
| 5,828,402 A | 10/1998 | Collings |
| 5,854,927 A | 12/1998 | Gelissen |
| 5,859,662 A | 1/1999 | Cragun et al. |
| 5,861,881 A | 1/1999 | Freeman et al. |
| 5,894,320 A | 4/1999 | Vancelette |
| 5,898,838 A | 4/1999 | Wagner |
| 5,917,830 A | 6/1999 | Chen et al. |
| 5,920,642 A | 7/1999 | Merjanian |
| 5,929,849 A | 7/1999 | Kikinis |
| 5,929,850 A | 7/1999 | Broadwin et al. |
| 5,931,908 A | 8/1999 | Gerba et al. |
| 5,945,988 A | 8/1999 | Williams et al. |
| 5,951,639 A | 9/1999 | MacInnis |
| 5,970,504 A | 10/1999 | Abe et al. |
| 5,973,683 A | 10/1999 | Cragun et al. |
| 5,977,962 A | 11/1999 | Chapman et al. |
| 5,978,013 A | 11/1999 | Jones et al. |
| 5,982,399 A | 11/1999 | Scully et al. |
| 5,987,509 A | 11/1999 | Portuesi |
| 5,990,911 A | 11/1999 | Arrott |
| 5,995,091 A | 11/1999 | Near et al. |
| 6,002,393 A | 12/1999 | Hite et al. |
| 6,002,443 A | 12/1999 | Iggulden |
| 6,006,241 A | 12/1999 | Purnaveja et al. |
| 6,006,256 A | 12/1999 | Zdepski et al. |
| 6,012,098 A | 1/2000 | Bayeh et al. |
| 6,020,882 A | 2/2000 | Kinghorn et al. |
| 6,021,275 A | 2/2000 | Horwat |
| 6,028,950 A | 2/2000 | Merjanian |
| 6,029,045 A | 2/2000 | Picco et al. |
| 6,038,367 A | 3/2000 | Abecassis |
| 6,049,821 A | 4/2000 | Theriault et al. |
| 6,057,833 A | 5/2000 | Heidmann et al. |
| 6,057,872 A | 5/2000 | Candelore |
| 6,058,430 A | 5/2000 | Kaplan |
| 6,061,056 A | 5/2000 | Menard et al. |
| 6,061,719 A | 5/2000 | Bendinelli et al. |
| 6,069,672 A | 5/2000 | Claassen |
| 6,075,526 A | 6/2000 | Rothmuller |
| 6,075,971 A | 6/2000 | Williams et al. |
| 6,078,322 A | 6/2000 | Simonoff et al. |
| 6,083,276 A | 7/2000 | Davidson et al. |
| 6,091,886 A | 7/2000 | Abecassis |
| 6,100,916 A | 8/2000 | August et al. |
| 6,104,334 A | 8/2000 | Allport |
| 6,104,423 A | 8/2000 | Elam |
| 6,124,877 A | 9/2000 | Schmidt |
| 6,125,259 A | 9/2000 | Perlman |
| 6,128,011 A | 10/2000 | Peng |
| 6,134,243 A | 10/2000 | Jones et al. |
| 6,144,401 A | 11/2000 | Casement et al. |
| 6,151,444 A | 11/2000 | Abecassis |
| 6,154,205 A | 11/2000 | Carroll et al. |
| 6,154,771 A | 11/2000 | Rangan et al. |
| 6,163,272 A | 12/2000 | Goode |
| 6,166,780 A | 12/2000 | Bray |
| 6,173,317 B1 | 1/2001 | Chaddha et al. |
| 6,173,437 B1 | 1/2001 | Polcyn |
| 6,175,718 B1 | 1/2001 | Kim et al. |
| 6,175,840 B1 | 1/2001 | Chen et al. |
| 6,177,931 B1 | 1/2001 | Alexander et al. |
| 6,178,446 B1 | 1/2001 | Gerszberg et al. |
| 6,195,090 B1 | 2/2001 | Riggins, III |
| 6,201,538 B1 | 3/2001 | Wugofski |
| 6,216,263 B1 | 4/2001 | Elam |
| 6,226,793 B1 | 5/2001 | Kwoh |
| 6,229,524 B1 | 5/2001 | Chernock et al. |
| 6,229,546 B1 | 5/2001 | Lancaster et al. |
| 6,230,172 B1 | 5/2001 | Purnaveja et al. |
| 6,240,555 B1 | 5/2001 | Shoff et al. |
| 6,256,785 B1 | 7/2001 | Klappert et al. |
| 6,263,189 B1 | 7/2001 | Reagor |
| 6,263,332 B1 | 7/2001 | Nasr et al. |
| 6,263,500 B1 | 7/2001 | Yoshida et al. |
| 6,266,793 B1 | 7/2001 | Mozdzen et al. |
| 6,269,216 B1 | 7/2001 | Abecassis |
| 6,292,805 B1 | 9/2001 | Basso et al. |
| 6,297,853 B1 | 10/2001 | Sharir et al. |
| 6,308,327 B1 | 10/2001 | Liu et al. |
| 6,314,568 B1 | 11/2001 | Ochiai et al. |
| 6,317,881 B1 | 11/2001 | Shah-Nazaroff et al. |
| 6,324,519 B1 | 11/2001 | Eldering |
| 6,330,719 B1 | 12/2001 | Zigmond et al. |
| 6,345,278 B1 | 2/2002 | Hitchcock et al. |
| 6,349,410 B1 | 2/2002 | Lortz |
| 6,356,933 B2 | 3/2002 | Mitchell et al. |
| 6,357,042 B2 | 3/2002 | Srinivasan et al. |
| 6,359,661 B1 | 3/2002 | Nickum |
| 6,363,380 B1 | 3/2002 | Dimitrova |
| 6,377,995 B2 | 4/2002 | Agraharam et al. |
| 6,404,445 B1 | 6/2002 | Galea et al. |

(56) References Cited

U.S. PATENT DOCUMENTS

| | | | |
|---|---|---|---|
| 6,415,438 B1 | 7/2002 | Blackketter et al. | |
| 6,426,778 B1 | 7/2002 | Valdez, Jr. | |
| 6,438,752 B1 | 8/2002 | McClard | |
| 6,446,246 B1 | 9/2002 | Suto | |
| 6,446,261 B1 | 9/2002 | Rosser | |
| 6,449,766 B1 | 9/2002 | Fleming | |
| 6,449,767 B1 | 9/2002 | Krapf et al. | |
| 6,463,585 B1 | 10/2002 | Hendricks et al. | |
| 6,476,828 B1 | 11/2002 | Burkett et al. | |
| 6,476,833 B1 | 11/2002 | Moshfeghi | |
| 6,477,579 B1 | 11/2002 | Kunkel et al. | |
| 6,481,011 B1 | 11/2002 | Lemmons | |
| 6,483,547 B1 | 11/2002 | Eyer | |
| 6,493,872 B1 | 12/2002 | Rangan et al. | |
| 6,513,160 B2 | 1/2003 | Dureau | |
| 6,519,770 B2 | 2/2003 | Ford | |
| 6,551,357 B1 | 4/2003 | Madduri | |
| 6,560,366 B1 | 5/2003 | Wilkins | |
| 6,560,777 B2 | 5/2003 | Blackketter et al. | |
| 6,581,207 B1 | 6/2003 | Sumita et al. | |
| 6,594,825 B1 | 7/2003 | Goldschmidt Iki | |
| 6,615,408 B1 | 9/2003 | Kaiser et al. | |
| 6,675,384 B1 | 1/2004 | Block et al. | |
| 6,675,388 B1 | 1/2004 | Beckmann et al. | |
| 6,698,020 B1 | 2/2004 | Zigmond et al. | |
| 6,721,954 B1 | 4/2004 | Nickum | |
| 6,725,421 B1 | 4/2004 | Boucher et al. | |
| 6,760,043 B2 | 7/2004 | Markel | |
| 6,766,524 B1 | 7/2004 | Matheny et al. | |
| 6,785,902 B1 | 8/2004 | Zigmond et al. | |
| 6,791,579 B2 | 9/2004 | Markel | |
| 6,795,826 B2* | 9/2004 | Flinn | G06F 21/6218 |
| 6,804,675 B1 | 10/2004 | Knight et al. | |
| 6,826,597 B1 | 11/2004 | Lonnroth et al. | |
| 6,845,374 B1* | 1/2005 | Oliver | H04L 51/18 |
| 6,880,171 B1 | 4/2005 | Ahmad et al. | |
| 6,938,270 B2 | 8/2005 | Blackketter et al. | |
| 6,941,521 B2 | 9/2005 | Lin et al. | |
| 7,644,427 B1* | 1/2010 | Horvitz | H04H 60/37 |
| | | | 725/13 |
| 7,757,250 B1* | 7/2010 | Horvitz | H04H 60/37 |
| | | | 725/14 |
| 7,853,600 B2* | 12/2010 | Herz | G06Q 20/383 |
| | | | 707/694 |
| 8,108,341 B2 | 1/2012 | Barsook et al. | |
| 8,234,147 B2 | 7/2012 | Olejniczak et al. | |
| 8,286,206 B1 | 10/2012 | Aaron et al. | |
| 8,346,624 B2* | 1/2013 | Goad | G06Q 30/02 |
| | | | 705/26.1 |
| 8,402,031 B2 | 3/2013 | Govani et al. | |
| 8,515,975 B1 | 8/2013 | Federici | |
| 8,539,359 B2* | 9/2013 | Rapaport | G06Q 10/10 |
| | | | 715/751 |
| 8,666,979 B2* | 3/2014 | Chen | G06F 16/335 |
| | | | 707/732 |
| 8,677,235 B2 | 3/2014 | Chronister et al. | |
| 8,803,882 B2 | 8/2014 | Lam et al. | |
| 8,949,871 B2 | 2/2015 | Chai et al. | |
| 9,602,563 B2* | 3/2017 | Barkai | H04L 65/4084 |
| 9,699,503 B2* | 7/2017 | Fishman | H04N 21/252 |
| 9,800,927 B2 | 10/2017 | Chai | |
| 2001/0011375 A1 | 8/2001 | Yun et al. | |
| 2001/0021994 A1 | 9/2001 | Nash | |
| 2001/0023436 A1 | 9/2001 | Srinivasan et al. | |
| 2001/0037500 A1 | 11/2001 | Reynolds et al. | |
| 2002/0010625 A1* | 1/2002 | Smith | G06Q 30/02 |
| | | | 705/14.52 |
| 2002/0010923 A1 | 1/2002 | Pack et al. | |
| 2002/0011988 A1 | 1/2002 | Sai et al. | |
| 2002/0023263 A1 | 2/2002 | Ahn et al. | |
| 2002/0029256 A1 | 3/2002 | Zintel et al. | |
| 2002/0035728 A1 | 3/2002 | Fries | |
| 2002/0049983 A1 | 4/2002 | Bove, Jr. et al. | |
| 2002/0049984 A1 | 4/2002 | Klappert et al. | |
| 2002/0053084 A1 | 5/2002 | Escobar et al. | |
| 2002/0056090 A1 | 5/2002 | Wagner et al. | |
| 2002/0056136 A1 | 5/2002 | Wistendahl et al. | |
| 2002/0057286 A1 | 5/2002 | Markel | |
| 2002/0057837 A1 | 5/2002 | Wilkinson et al. | |
| 2002/0059117 A1 | 5/2002 | Yoch et al. | |
| 2002/0059588 A1 | 5/2002 | Huber et al. | |
| 2002/0059590 A1 | 5/2002 | Kitsukawa et al. | |
| 2002/0059629 A1 | 5/2002 | Markel | |
| 2002/0065678 A1 | 5/2002 | Peliotis et al. | |
| 2002/0069405 A1 | 6/2002 | Chapin et al. | |
| 2002/0073416 A1 | 6/2002 | Ramsey Catan | |
| 2002/0088008 A1 | 7/2002 | Markel | |
| 2002/0088011 A1 | 7/2002 | Lamkin et al. | |
| 2002/0089542 A1 | 7/2002 | Imamura | |
| 2002/0095687 A1 | 7/2002 | Shintani et al. | |
| 2002/0112249 A1 | 8/2002 | Hendricks et al. | |
| 2002/0120931 A1 | 8/2002 | Huber et al. | |
| 2002/0126990 A1 | 9/2002 | Rasmussen et al. | |
| 2002/0129364 A1 | 9/2002 | Smith et al. | |
| 2002/0131511 A1 | 9/2002 | Zenoni | |
| 2002/0133817 A1 | 9/2002 | Markel | |
| 2002/0147987 A1 | 10/2002 | Reynolds et al. | |
| 2002/0162117 A1 | 10/2002 | Pearson et al. | |
| 2002/0162121 A1 | 10/2002 | Mitchell | |
| 2002/0166119 A1 | 11/2002 | Cristofalo | |
| 2002/0174425 A1 | 11/2002 | Markel et al. | |
| 2003/0028873 A1 | 2/2003 | Lemmons | |
| 2003/0037334 A1 | 2/2003 | Khoo et al. | |
| 2003/0093790 A1* | 5/2003 | Logan | G10H 1/0033 |
| | | | 725/38 |
| 2003/0149983 A1 | 8/2003 | Markel | |
| 2003/0172374 A1 | 9/2003 | Vinson et al. | |
| 2003/0177199 A1 | 9/2003 | Zenoni | |
| 2003/0196164 A1 | 10/2003 | Gupta et al. | |
| 2003/0217365 A1* | 11/2003 | Caputo | H04N 7/106 |
| | | | 725/95 |
| 2003/0237093 A1 | 12/2003 | Marsh et al. | |
| 2004/0021679 A1 | 2/2004 | Chapman et al. | |
| 2004/0031062 A1 | 2/2004 | Lemmons | |
| 2004/0054572 A1* | 3/2004 | Oldale | G06F 16/337 |
| | | | 706/1 |
| 2004/0056900 A1 | 3/2004 | Blume | |
| 2004/0073953 A1 | 4/2004 | Xu et al. | |
| 2004/0163045 A1 | 8/2004 | Hui et al. | |
| 2004/0210947 A1 | 10/2004 | Shusman | |
| 2004/0237108 A1 | 11/2004 | Drazin et al. | |
| 2005/0028194 A1 | 2/2005 | Elenbaas et al. | |
| 2005/0038717 A1* | 2/2005 | McQueen, III | G06Q 30/02 |
| | | | 705/26.61 |
| 2005/0144499 A1 | 6/2005 | Narahara et al. | |
| 2005/0160458 A1 | 7/2005 | Baumgartner | |
| 2006/0008256 A1* | 1/2006 | Khedouri | G06Q 20/206 |
| | | | 386/234 |
| 2006/0010464 A1 | 1/2006 | Azami | |
| 2006/0123448 A1 | 6/2006 | Ma et al. | |
| 2006/0200434 A1* | 9/2006 | Flinn | G06Q 30/0255 |
| | | | 706/12 |
| 2006/0242554 A1 | 10/2006 | Gerace et al. | |
| 2006/0277098 A1 | 12/2006 | Chung et al. | |
| 2007/0011702 A1 | 1/2007 | Vaysman | |
| 2007/0033607 A1 | 2/2007 | Bryan | |
| 2007/0041705 A1* | 2/2007 | Bontempi | H04N 5/76 |
| | | | 386/262 |
| 2007/0100824 A1* | 5/2007 | Richardson | G06F 16/951 |
| 2007/0136753 A1 | 6/2007 | Bovenschulte et al. | |
| 2007/0157242 A1 | 7/2007 | Cordray et al. | |
| 2007/0157248 A1 | 7/2007 | Ellis | |
| 2008/0092173 A1* | 4/2008 | Shannon | H04N 5/44543 |
| | | | 725/47 |
| 2008/0117202 A1* | 5/2008 | Martinez | G06Q 30/0201 |
| | | | 345/418 |
| 2008/0155588 A1 | 6/2008 | Roberts et al. | |
| 2008/0163059 A1 | 7/2008 | Craner | |
| 2008/0178239 A1* | 7/2008 | Yampanis | H04L 41/5064 |
| | | | 725/110 |
| 2008/0222106 A1 | 9/2008 | Rao et al. | |
| 2008/0301118 A1* | 12/2008 | Chien | G06F 16/954 |

(56) References Cited

U.S. PATENT DOCUMENTS

| | | | |
|---|---|---|---|
| 2008/0320517 A1 | 12/2008 | Beadle et al. | |
| 2009/0006374 A1* | 1/2009 | Kim | G06F 16/335 |
| 2009/0031354 A1 | 1/2009 | Riley et al. | |
| 2009/0037254 A1 | 2/2009 | Colando | |
| 2009/0046101 A1* | 2/2009 | Askey | G06Q 30/02 |
| | | | 345/470 |
| 2009/0052859 A1 | 2/2009 | Greenberger et al. | |
| 2009/0060469 A1* | 3/2009 | Olague | H04N 7/17318 |
| | | | 386/297 |
| 2009/0070185 A1* | 3/2009 | Farrelly | G06Q 20/123 |
| | | | 705/14.4 |
| 2009/0083326 A1* | 3/2009 | Pelton | G06F 16/4387 |
| 2009/0089433 A1* | 4/2009 | Kisel | H04L 67/1008 |
| | | | 709/226 |
| 2009/0092183 A1* | 4/2009 | O'Hern | H04N 21/2407 |
| | | | 375/240.01 |
| 2009/0100469 A1* | 4/2009 | Conradt | H04N 7/17318 |
| | | | 725/46 |
| 2009/0144773 A1 | 6/2009 | Cavanaugh et al. | |
| 2009/0150214 A1 | 6/2009 | Mohan | |
| 2009/0150786 A1* | 6/2009 | Brown | G06Q 10/10 |
| | | | 715/733 |
| 2009/0158337 A1* | 6/2009 | Stiers | H04N 5/44591 |
| | | | 725/44 |
| 2009/0163183 A1* | 6/2009 | O'Donoghue | G06Q 30/02 |
| | | | 455/414.1 |
| 2009/0164450 A1 | 6/2009 | Martinez et al. | |
| 2009/0182725 A1 | 7/2009 | Govani et al. | |
| 2009/0210902 A1 | 8/2009 | Slaney et al. | |
| 2009/0217324 A1 | 8/2009 | Massimi | |
| 2009/0249393 A1 | 10/2009 | Shelton et al. | |
| 2009/0265359 A1 | 10/2009 | Barsook et al. | |
| 2010/0042608 A1* | 2/2010 | Kane, Jr. | G06F 16/9535 |
| | | | 707/732 |
| 2010/0058241 A1 | 3/2010 | Saijo et al. | |
| 2010/0083318 A1* | 4/2010 | Weare | G11B 27/105 |
| | | | 725/46 |
| 2010/0088312 A1* | 4/2010 | Goldfeder | G11B 27/105 |
| | | | 707/732 |
| 2010/0293034 A1* | 11/2010 | Olejniczak | G06Q 10/063 |
| | | | 705/14.45 |
| 2011/0035707 A1 | 2/2011 | Kitayama | |
| 2011/0060649 A1* | 3/2011 | Dunk | G06Q 30/0255 |
| | | | 705/14.53 |
| 2011/0145040 A1 | 6/2011 | Zahn et al. | |
| 2011/0162008 A1* | 6/2011 | Aldrey | H04N 21/235 |
| | | | 725/40 |
| 2011/0225290 A1* | 9/2011 | Kansal | H04L 67/1097 |
| | | | 709/224 |
| 2011/0283304 A1 | 11/2011 | Roberts et al. | |
| 2012/0059825 A1 | 3/2012 | Fishman et al. | |
| 2012/0060094 A1 | 3/2012 | Irwin et al. | |
| 2012/0060176 A1 | 3/2012 | Chai et al. | |
| 2012/0060195 A1 | 3/2012 | Fishman et al. | |
| 2015/0121406 A1 | 4/2015 | Chai et al. | |
| 2018/0035161 A1 | 2/2018 | Fishman et al. | |

FOREIGN PATENT DOCUMENTS

| | | |
|---|---|---|
| EP | 0921696 A1 | 6/1999 |
| EP | 0967804 A2 | 12/1999 |
| EP | 0982943 A2 | 3/2000 |
| EP | 1021036 A2 | 7/2000 |
| EP | 0967804 A3 | 11/2000 |
| EP | 1056273 A2 | 11/2000 |
| EP | 1071287 A2 | 1/2001 |
| EP | 1056273 A3 | 1/2002 |
| FR | 2730837 A1 | 2/1995 |
| GB | 2327837 A | 2/1999 |
| JP | 10042271 A | 2/1998 |
| JP | 2000227851 A | 8/2000 |
| JP | 2003308145 A | 10/2003 |
| WO | WO-9115921 A1 | 10/1991 |
| WO | WO-9510919 A1 | 4/1995 |
| WO | WO-9625821 A1 | 8/1996 |
| WO | WO-9633572 A1 | 10/1996 |
| WO | WO-9637075 A1 | 11/1996 |
| WO | WO-9749236 A1 | 12/1997 |
| WO | WO-9749239 A1 | 12/1997 |
| WO | WO-9831114 A1 | 7/1998 |
| WO | WO-9915968 A1 | 4/1999 |
| WO | WO-1999031881 A1 | 6/1999 |
| WO | WO-9935832 A1 | 7/1999 |
| WO | WO-0005884 A1 | 2/2000 |
| WO | WO-0038427 A1 | 6/2000 |
| WO | WO-0049520 A1 | 8/2000 |
| WO | WO-0049801 A1 | 8/2000 |
| WO | WO-0057295 A1 | 9/2000 |
| WO | WO-0128235 A1 | 4/2001 |
| WO | WO-2001050752 A1 | 7/2001 |
| WO | WO-0199416 A2 | 12/2001 |
| WO | WO-0232136 A2 | 4/2002 |
| WO | WO-2002032136 A2 | 4/2002 |
| WO | WO-2012033489 A1 | 3/2012 |
| WO | WO-2012033921 A1 | 3/2012 |

OTHER PUBLICATIONS

"U.S. Appl. No. 12/878,001, Examiner Interview Summary dated Dec. 18, 2017", 3 pgs.

"U.S. Appl. No. 12/878,001, Response filed Dec. 22, 2017 to Non Final Office Action dated Aug. 24, 2017", 16 pgs.

"Canadian Application Serial No. 2,810,511, Response filed Dec. 15, 2017 to Office Action dated Jun. 21, 2017", 37 pgs.

"Canadian Application Serial No. 2,810,521, Office Action dated Mar. 1, 2018", 5 pgs.

"About TVML", Product Documentation, [Online]. Retrieved from the Internet: <URL: http://web.archive.org/web/19961214195058/http://www.tvml.co.uk/developer/about.htm>, (1996), 2 pgs.

"U.S. Appl. No. 09/941,148, Advisory Action dated May 20, 2004", 3 pgs.

"U.S. Appl. No. 09/941,148, Amendment filed Apr. 26, 2004", 14 pgs.

"U.S. Appl. No. 09/941,148, Amendment filed Sep. 19, 2005", 17 pgs.

"U.S. Appl. No. 09/941,148, Examiner Interview Summary dated May 27, 2005", 2 pgs.

"U.S. Appl. No. 09/941,148, Final Office Action dated Apr. 25, 2007", 18 pgs.

"U.S. Appl. No. 09/941,148, Final Office Action dated May 19, 2005", 10 pgs.

"U.S. Appl. No. 09/941,148, Final Office Action dated Oct. 24, 2003", 11 pgs.

"U.S. Appl. No. 09/941,148, Non Final Office Action dated Apr. 1, 2003", 8 pgs.

"U.S. Appl. No. 09/941,148, Non Final Office Action dated Aug. 2, 2006", 16 pgs.

"U.S. Appl. No. 09/941,148, Non Final Office Action dated Aug. 11, 2004", 13 pgs.

"U.S. Appl. No. 09/941,148, Non Final Office Action dated Nov. 28, 2005", 19 pgs.

"U.S. Appl. No. 09/941,148, Preliminary Amendment filed Jun. 19, 2002", 1 pg.

"U.S. Appl. No. 09/941,148, Response filed Feb. 2, 2007 to Non Final Office Action dated Aug. 2, 2006", 17 pgs.

"U.S. Appl. No. 09/941,148, Response filed Jul. 31, 2003 to Non Final Office Action dated Apr. 1, 2003", 10 pgs.

"U.S. Appl. No. 09/941,148, Response filed Nov. 12, 2004 to Non Final Office Action dated Aug. 11, 2004", 15 pgs.

"U.S. Appl. No. 12/877,034, Appeal Brief filed Jun. 11, 2015", 21 pgs.

"U.S. Appl. No. 12/877,034, Appeal Decision mailed Jan. 3, 2017", 10 pgs.

"U.S. Appl. No. 12/877,034, Decision on Pre-Appeal Brief Request mailed Dec. 11, 2014", 2 pgs.

"U.S. Appl. No. 12/877,034, Examiner Interview Summary dated Jul. 24, 2013", 3 pgs.

(56) References Cited

OTHER PUBLICATIONS

"U.S. Appl. No. 12/877,034, Final Office Action dated Mar. 25, 2013", 14 pgs.
"U.S. Appl. No. 12/877,034, Final Office Action dated Jun. 13, 2014", 14 pgs.
"U.S. Appl. No. 12/877,034, Non Final Office Action dated Aug. 10, 2012", 11 pgs.
"U.S. Appl. No. 12/877,034, Non Final Office Action dated Oct. 1, 2013", 13 pgs.
"U.S. Appl. No. 12/877,034, Notice of Allowance dated Mar. 29, 2017", 9 pgs.
"U.S. Appl. No. 12/877,034, Pre-Appeal Brief Request filed Nov. 4, 2014", 5 pgs.
"U.S. Appl. No. 12/877,034, Response filed Feb. 26, 2014 to Non Final Office Action dated Oct. 1, 2013", 13 lpgs.
"U.S. Appl. No. 12/877,034, Response filed Aug. 26, 2013 to Final Office Action dated Mar. 25, 2013", 12 pgs.
"U.S. Appl. No. 12/877,034, Response filed Nov. 13, 2012 to Non Final Office Action dated Aug. 10, 2012", 11 pgs.
"U.S. Appl. No. 12/877,875, Advisory Action dated Aug. 2, 2013", 3 pgs.
"U.S. Appl. No. 12/877,875, Final Office Action dated Apr. 23, 2013", 12 pgs.
"U.S. Appl. No. 12/877,875, Non Final Office Action dated Apr. 15, 2014", 13 pgs.
"U.S. Appl. No. 12/877,875, Non Final Office Action dated Nov. 6, 2012", 13 pgs.
"U.S. Appl. No. 12/877,875, Notice of Allowance dated Sep. 17, 2014", 12 pgs.
"U.S. Appl. No. 12/877,875, Response filed Mar. 11, 2013 to Non Final Office Action dated Nov. 6, 2012", 10 pgs.
"U.S. Appl. No. 12/877,875, Response filed Jul. 16, 2013 to Final Office Action dated Apr. 23, 2013", 11 pgs.
"U.S. Appl. No. 12/877,875, Response filed Aug. 15, 2014 to Non Final Office Action dated Apr. 15, 2014", 12 pgs.
"U.S. Appl. No. 12/877,993, Amendment with Request to Reopen Prosecution filed Jul. 7, 2017", 18 pgs.
"U.S. Appl. No. 12/877,993, Appeal Brief filed Feb. 24, 2016", 20 pgs.
"U.S. Appl. No. 12/877,993, Appeal Decision mailed May 8, 2017", 9 pgs.
"U.S. Appl. No. 12/877,993, Final Office Action dated Jan. 28, 2015", 35 pgs.
"U.S. Appl. No. 12/877,993, Final Office Action dated Mar. 15, 2013", 30 pgs.
"U.S. Appl. No. 12/877,993, Non Final Office Action dated Jun. 20, 2014", 31 pgs.
"U.S. Appl. No. 12/877,993, Non Final Office Action dated Aug. 2, 2012", 26 pgs.
"U.S. Appl. No. 12/877,993, Response filed Jul. 22, 2013 to Final Office Action dated Mar. 15, 2013", 17 pgs.
"U.S. Appl. No. 12/877,993, Response filed Oct. 14, 2014 to Non Final Office Action dated Jun. 20, 2014", 19 pgs.
"U.S. Appl. No. 12/877,993, Response filed Dec. 3, 2012 to Non Final Office Action dated Aug. 2, 2012", 17 pgs.
"U.S. Appl. No. 12/878,001, Appeal Brief filed May 12, 2015", 16 pgs.
"U.S. Appl. No. 12/878,001, Appeal Decision mailed Mar. 20, 2017", 10 pgs.
"U.S. Appl. No. 12/878,001, Examiner Interview Summary dated Jul. 24, 2013", 3 pgs.
"U.S. Appl. No. 12/878,001, Final Office Action dated Mar. 29, 2013", 13 pgs.
"U.S. Appl. No. 12/878,001, Final Office Action dated Jul. 17, 2014", 12 pgs.
"U.S. Appl. No. 12/878,001, Non Final Office Action dated Aug. 9, 2012", 11 pgs.
"U.S. Appl. No. 12/878,001, Non Final Office Action dated Aug. 24, 2017", 14 pgs.
"U.S. Appl. No. 12/878,001, Non Final Office Action dated Oct. 3, 2013", 12 pgs.
"U.S. Appl. No. 12/878,001, Request to Reopen Prosecution under 37 C.F.R. § 41.50 filed May 19, 2017", 8 pgs.
"U.S. Appl. No. 12/878,001, Response filed Apr. 1, 2014 to Non Final Office Action dated Oct. 3, 2013", 13 pgs.
"U.S. Appl. No. 12/878,001, Response filed Aug. 23, 2013 to Final Office Action dated Mar. 29, 2013", 12 pgs.
"U.S. Appl. No. 12/878,001, Response filed Nov. 9, 2012 to Non Final Office Action dated Aug. 9, 2012", 11 pgs.
"U.S. Appl. No. 14/588,871, Final Office Action dated Mar. 7, 2016", 12 pgs.
"U.S. Appl. No. 14/588,871, Final Office Action dated Mar. 31, 2017", 17 pgs.
"U.S. Appl. No. 14/588,871, Non Final Office Action dated Jun. 29, 2015", 13 pgs.
"U.S. Appl. No. 14/588,871, Non Final Office Action dated Sep. 9, 2016", 12 pgs.
"U.S. Appl. No. 14/588,871, Non Final Office Action dated Sep. 15, 2016", 16 pgs.
"U.S. Appl. No. 14/588,871, Notice of Allowance dated Jun. 26, 2017", 5 pgs.
"U.S. Appl. No. 14/588,871, Notice of Allowance dated Sep. 12, 2017", 2 pgs.
"U.S. Appl. No. 14/588,871, Preliminary Amendment filed Jan. 27, 2015", 8 pgs.
"U.S. Appl. No. 14/588,871, Response filed Jan. 17, 2017 to Non Final Office Action dated Sep. 15, 2016", 20 pgs.
"U.S. Appl. No. 14/588,871, Response filed May 31, 2017 to Final Office Action dated Mar. 31, 2017", 19 pgs.
"U.S. Appl. No. 14/588,871, Response filed Jul. 7, 2016 Final Office Action dated Mar. 7, 2016", 12 pgs.
"U.S. Appl. No. 14/588,871, Response filed Oct. 29, 2015 to Non Final Office Action dated Jun. 29, 2015", 11 pgs.
"U.S. Appl. No. 14/588,871, Supplemental Notice of Allowability dated Jul. 17, 2017", 2 pgs.
"U.S. Appl. No. 15/726,102, Preliminary Amendment filed Oct. 6, 2017", 7 pgs.
"Australian Application Serial No. 2011101152, Examination Report No. 1 dated May 6, 2013", 4 pgs.
"Australian Application Serial No. 2011101152, Response filed Sep. 17, 2013 to Examination Report No. 1 dated May 6, 2013", 13 pgs.
"Australian Application Serial No. 2011299221, Response filed Jan. 15, 2015", 19 pgs.
"Australian Application Serial No. 2011299234, Amendment filed Apr. 4, 2013", 11 pgs.
"Australian Application Serial No. 2011299234, Amendment filed Aug. 25, 2015", 26 pgs.
"Australian Application Serial No. 2011299234, First Examiner Report dated Aug. 25, 2014", 3 pgs.
"Australian Application Serial No. 2011299234, Response filed Oct. 26, 2015 to Subsequent Examiners Report dated Sep. 4, 2015", 3 pgs.
"Australian Application Serial No. 2011299234, Subsequent Examiners Report dated Sep. 4, 2015", 4 pgs.
"Australian Application Serial No. 2016201377, First Examiner Report dated Feb. 1, 2017", 3 pgs.
"Australian Application Serial No. 2016201377, Response filed May 25, 2017 to First Examiner Report dated Feb. 1, 2017", 55 pgs.
"Australian Application Serial No. 2016201377, Response filed Aug. 9, 2017 to Subsequent Examiners Report dated Jun. 6, 2017", 2 pgs.
"Australian Application Serial No. 2016201377, Subsequent Examiners Report dated Jun. 6, 2017", 3 pgs.
"Australian Application Serial No. 2016201377, Subsequent Examiners Report dated Aug. 23, 2017", 3 pgs.
"Australian Serial No. 2011299221, First Examiner Report dated May 2, 2014", 3 pgs.
"Brazilian Application Serial No. BR1120130055251, Voluntary Amendment filed Sep. 8, 2014", with English Translation, 9 pgs.
"Canadian Application Serial No. 2,810,511, Office Action dated Jun. 21, 2017", 4 pgs.

(56) References Cited

OTHER PUBLICATIONS

"Canadian Application Serial No. 2,810,521, Office Action dated Jun. 8, 2017", 3 pgs.
"Canadian Application Serial No. 2,810,521, Response filed Sep. 7, 2017 to Office Action dated Jun. 8, 2017", 15 pgs.
"European Application Serial No. 01968190.7, European Amendment filed Aug. 18, 2011", 1 pg.
"European Application Serial No. 01968190.7, European Amendment filed Sep. 20, 2011", 3 pgs.
"European Application Serial No. 01968190.7, Office Action dated May 17, 2010", 9 pgs.
"European Application Serial No. 01968190.7, Office Action dated Nov. 6, 2006", 4 pgs.
"European Application Serial No. 01968190.7, Response filed May 16, 2007 to Office Action dated Nov. 6, 2006", 26 pgs.
"European Application Serial No. 01968190.7, Response filed Sep. 24, 2010 to Office Action dated May 17, 2010", 5 pgs.
"European Application Serial No. 11824132.2, Extended European Search Report dated Feb. 25, 2014", 6 pgs.
"European Application Serial No. 11824132.2, Response filed Aug. 29, 2014", 12 pgs.
"HTML 4.0 Specification", W3C Recommendation, XP002191626, (Apr. 24, 1998), 12 pgs.
"HTML Support—Multimedia and Images", [Online] Retrieved from the Internet: <URL: http://www.citycat.ru/doc/HTML/IExplorer.30/mmedia.htm#Marquee>, (1996), 4 pgs.
"International Application Serial No. PCT/US01/26801, International Preliminary Examination Report dated Nov. 25, 2003", 12 pgs.
"International Application Serial No. PCT/US01/26801, International Search Report dated Mar. 14, 2002", 3 pgs.
"International Application Serial No. PCT/US2011/50712, International Preliminary Report on Patentability dated Mar. 21, 2013", 8 pgs.
"International Application Serial No. PCT/US2011/50712, International Search Report dated Jan. 5, 2012", 2 pgs.
"International Application Serial No. PCT/US2011/50712, Written Opinion dated Jan. 5, 2012", 6 pgs.
"International Application Serial No. PCT/US2011/50839, International Preliminary Report on Patentability dated Mar. 21, 2013", 6 pgs.
"International Application Serial No. PCT/US2011/50839, International Search Report dated Dec. 30, 2011", 2 pgs.
"International Application Serial No. PCT/US2011/50839, Written Opinion dated Dec. 30, 2011", 4 pgs.
"MPEG-4 Authoring Tools Let Pros, Consumers Create Mutimedia for Web Pages, TV, HDTV", Sarnoff Document, XP002155140, (Dec. 10, 1998), 2 pgs.
Alvaer, Jose, "Realnetworks' Realaudio and Realvideo", Webdeveloper.com, guide to streaming multimedia, XP002150113, ISBN:0-471-24822-3, (1998), 20 pgs.
Chambers, C. S., "Designing a set-top box operating system", International conference on consumer electronics,IEEE US vol. CONF. 14, XP000547858 ISBN 0-7803-2141-3, (Jun. 7, 1995), 368-369.
Clearplay, "Being a Very Cool Responsible Parent Just Got a Whole Lot Easier", [Online]. Retrieved from the Internet: <URL: http://www.clearplay.com/>, (Accessed Jan. 13, 2003), 2 pages.
Clearplay, "Enjoy the Show!", Press Release, Dec. 10, 2001, "ClearPlay Launches Groundbreaking Movie Filtering,", [Online]. Retrieved from the Internet: <URL: http://www.clearplay.com/10Dec2001.asp>, (Dec. 10, 2001), 2 pages.
Cobb, Jerry, "Taking Violence out of DVD Movies—System from ClearPlay Removes 'R' Content from DVDs", CNBC, [Online]. Retrieved from the Internet: <URL: http://www.msnbc.com/news/857154.asp?cpl=1,>, (Jan. 9, 2003), 3 pgs.

EBU Project Group B/CA, "Functional model of a conditional access system", EBU Technical Review, 266, Grand-Saconnex, CH, (Winter 1995), 64-77.
Fernandez, Panadero MC, et al., "Mass-customizing electronic journals", Online!, XP002177409, (May 10, 1999), 11 pgs.
Giles, Aaron, "Transparency—A Quick and Dirty Utility for Creating Tranparent GIF Images", [Online]. Retrieved from the Internet: <URL: http://www.mit.edu:8001/people/nocturne/etc/Transparency_notes.html>, (Aug. 19, 1994), 2 pgs.
Levin, "Software Design of a Personal Television Service", ICCE 2000, (2000), pp. 26-27.
Shim, S.Y. Shim, et al., "Template Based Synchronized Multimedia Integration Language Authoring Tool", Proceedings of the SPIE, SPIE, Bellingham, VA, vol. 3964, (Jan. 2000), 134-142.
Vuorimaa, Petri, et al., "XML Based Text TV", IEEE—WISE '00 Proceedings of the First International Conference on Web, (2000), 109-113.
Watson, Christopher, "Scripting the Web (times 2)", [Online]. Retrieved from the Internet: <URL: http://groups.google.com/groups?q=javascript+hypermedia&hl=en&selm=cwatson-3008961022470001%40204.212.150.108&rnum=7>, (Aug. 30, 1996), 2 pages.
"U.S. Appl. No. 12/877,993, Examiner Interview Summary dated Mar. 19, 2018", 3 pgs.
"U.S. Appl. No. 12/877,993, Final Office Action dated Jul. 9, 2018", 37 pgs.
"U.S. Appl. No. 12/877,993, Response filed Mar. 15, 2018 to Non Final Office Action dated Dec. 15, 2017", 25 pgs.
"U.S. Appl. No. 12/878,001, Final Office Action dated Apr. 23, 2018", 18 pgs.
"U.S. Appl. No. 15/726,102, Non Final Office Action dated Apr. 18, 2018", 32 pgs.
"Canadian Application Serial No. 2,810,511, Office Action dated Jun. 12, 2018", 4 pgs.
"U.S. Appl. No. 12/878,001, Examiner Interview Summary dated Jul. 27, 2018", 3 pgs.
"U.S. Appl. No. 12/878,001, Response filed Jul. 23, 2018 to Final Office Action dated Apr. 23, 2018", 12 pgs.
"Canadian Application Serial No. 2,810,521, Response filed Jul. 30, 2018 to Office Action dated Mar. 1, 2018", 17 pgs.
"Canadian Application Serial No. 2,810,511, Response filed Aug. 24, 2018 to Office Action dated Jun. 12, 2018", 26 pgs.
"U.S. Appl. No. 12/878,001, Notice of Allowance dated Oct. 2, 2018", 12 pgs.
"Canadian Application Serial No. 2,810,511, Office Action dated Dec. 10, 2018", 5 pgs.
"Canadian Application Serial No. 2,810,521, Examiner's Rule 30(2) Requisition mailed Jan. 4, 2019", 4 pgs.
"European Application Serial No. 11824132.2, Response filed Mar. 5, 2019 to Summons to Attend Oral Proceedings mailed Nov. 5, 2018", 29 pgs.
"European Application Serial No. 11824078.7, Communication Pursuant to Article 94(3) EPC mailed Aug. 16, 2018", 7 pgs.
"U.S. Appl. No. 12/877,993, Response filed Nov. 8, 2018 to Final Office Action dated Jul. 9, 2018", 15 pgs.
"European Application Serial No. 11824132.2, Summons to Attend Oral Proceedings mailed Nov. 5, 2018", 5 pgs.
"U.S. Appl. No. 12/877,993, Non Final Office Action dated Feb. 4, 2019", 34 pgs.
"Canadian Application Serial No. 2,810,511, Response filed Apr. 4, 2019 to Office Action dated Dec. 10, 2018", 36 pgs.
"U.S. Appl. No. 12/877,993, Response filed May 6, 2019 to Non Final Office Action dated Feb. 4, 2019", 15 pgs.
"U.S. Appl. No. 16/237,022, Preliminary Amendment Filed May 14, 2019", 8 pgs.
"U.S. Appl. No. 12/877,993, Examiner Interview Summary dated May 21, 2019", 3 pgs.

* cited by examiner

SMART PLAYLIST

PRIORITY APPLICATION

This application is a continuation of U.S. patent application Ser. No. 12/877,034, filed on Sep. 7, 2010, which is incorporated herein by reference in its entirety.

TECHNICAL FIELD

This application relates to the fields of media and entertainment and specifically to a smart playlist system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of media and entertainment, there is a new generation of viewers that has a high expectation of the level of entertainment to be enjoyed from various sources of content, such as, e.g., television programming, the Internet, and locally stored content. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
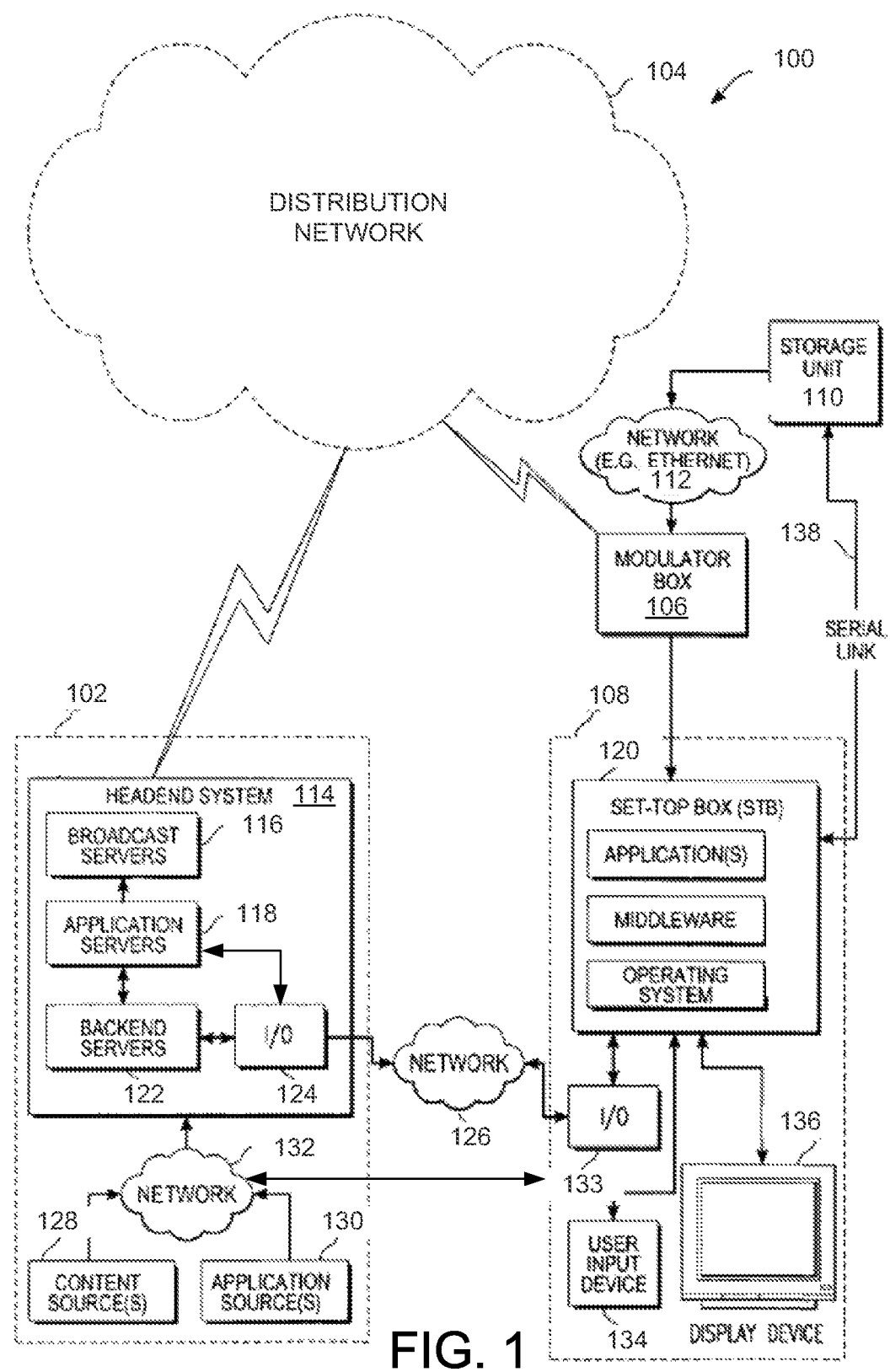
FIG. 1 illustrates an environment within which an example smart playlist may be implemented, in accordance with an example embodiment.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system is described to collect information from a great number of viewers' client devices, determine a list of popular content items based on the collected information, customize the list for a particular viewer, and send that list to the viewer's device. This approach to aiding a viewer in making choices in the universe of viewable content may be termed a smart playlist system. Example embodiments described herein provide systems and methods to generate a smart play list.

In one embodiment, a smart playlist system obtains from viewers' client devices content-related information such as, e.g., which programs are being currently viewed, which programs are being recorded and scheduled to be recorded, which content has been rated and the associated ratings, as well as recommendations pertaining to programs, purchases of various programs, etc. For the purposes of this description the terms content, content item, show, and program will be understood to denote viewable content. Data collected indiscriminately from the entire accessible community of viewers may be accumulated in a repository termed a global bucket. Data from the global bucket may be analyzed to determine programs that appear to be most popular at the time of the analyzing, i.e., appear to be of heightened interest to viewers. A certain number of programs that have been determined as most popular are compiled into a so-called hot list. The hot list may be made available to viewer, e.g., by communicating the list to the viewers' client devices or providing an access link that can be invoked from the users' devices.

Before a hot list is provided to a viewer, it may be personalized for the viewer by determining how relevant the items in the hot list are to that particular viewer and presenting to the viewer only those programs that have been determined to be of high relevance to the viewer. The relevancy of a particular program to a particular viewer may be determined by associating each item in the hot list with a score based on the viewer's profile, on the viewer's content viewing history and patterns, as well as based on information collected from the client devices of a subset of viewers who are members of the particular viewer's social network.

In one example embodiment, in addition to determining a personalized hot list of content items, a smart playlist system may trigger recording of a certain program as soon as the program has been identified as a live program and of high relevance to the viewer. For example, a viewer may not be tuned into a channel broadcasting a particular live sports event. If the smart playlist system determined that the live sports event is of high relevance to the viewer, the smart playlist system may trigger the recording of the live broadcast of the sports event on the viewer's client device (e.g., a set top box, a desktop computer, etc.) and also alerts the user to the fact that she may be interested in the event being currently broadcast on a certain channel. The viewer may then ignore the alert. If the viewer, instead, tunes to the suggested channel the viewer would not have missed the beginning of the broadcast because the recording of the program has been automatically triggered by an instruction provided to the viewer's client device from the smart playlist system. In one example, the high relevancy of the live broadcast may have been determined based on the fact that all of the viewer's social network contacts have either tuned into the associated channel or have scheduled the recording of the broadcast. In another example, the high relevancy of the live broadcast may have been determined based on the viewer's profile or on the viewer's viewing history. An example smart playlist system may be implemented within architecture illustrated in FIG. 1.

FIG. 1 illustrates network architecture of an example interactive media environment 100 wherein some embodiments of the present invention may be deployed. The interactive media environment 100 includes a source system 102 that communicates data (e.g., media content data and interactive application data) via a distribution network or system 104 (e.g., the Internet, a mobile communication network, or any other network capable of communicating digital data) and a modulator box 106 to a receiver system 108. In one example embodiment, the interactive media environment 100 optionally includes a storage unit 110 (e.g., personal computer) that communicates stored data via a network 112 to the modulator box 106 which, in turn, communicates the stored data, media content data, and interactive application data to the receiver system 108. The modulator box 106, storage unit 110, and the receiver system 108 may be co-located in a user's home. Thus, in one embodiment, the modulator box 106 may combine media content data and interactive application data received from the remote source system 102 with a local stored data provided by the storage unit 110 provided at the user's home.

Turning first to the source system 102, an example headend system 114 operates to communicate the data as a broadcast transmission. To this end, the headend system 114 is shown to include one or more broadcast servers 116 and, optionally, one or more application servers 118. Each of the broadcast servers 116 may operate to receive, encode, packetize, multiplex, modulate, and broadcast data from various sources and of various types. While the example embodiment is described herein as transmitting data from the headend system 114 as a broadcast, it will be appreciated that the relevant data could also be unicast or multicast from the source system 102 via the distribution system 104 and modulator box 106 to the receiver system 108. In various embodiments, data could also be transmitted from the source system 102 via a network connection to the receiver system 108. Further, in other example embodiments the source system 102 may be modified to facilitate communications via the Internet, a mobile phone network, or any other network capable of communicating digital data.

Each application server 118, in one example embodiment, compiles and provides interactive data modules to the broadcast server 116. The interactive data modules may also include data that is utilized by an interactive television application. The application server 118 may also include multiplexing functionality to enable multiplexing of, for example, interactive television applications and associated data with audio and video signals received from various sources. The application server 118 may also have the capability to feed (e.g., stream) multiple interactive television applications to one or more broadcast servers 116 for distribution to the receiver system 108. To this end, each application server 118 may implement a so-called "carousel," whereby code and data modules are provided to a broadcast server 116 in a cyclic, repetitive manner for inclusion within a transmission from the headend system 114. In other embodiments, code may reside permanently in a set-top box (STB) 120 (e.g., the code may be stored in non-volatile memory of the STB 120), may be pushed of downloaded to the STB 120, or be provided to the STB 120 in any other manner. In one embodiment, the application server 118 provides a smart playlist mechanism to collect information from viewers, determine a list of popular content items, customizing the list for a particular user and sending that lit to the user's device. The smart playlist mechanism will be discussed by way of example in more detail in connection with FIGS. 2-4.

The headend system 114 is also shown, by way of example, to include one or more backend servers 122, which are coupled to the application servers 118 and to an input/output device 124 (e.g., a modem pool). Specifically, the I/O device 124 is coupled to receive data from the receiver system 108 via a network 126 (e.g., the Internet) and to provide this data to backend servers 122. The backend servers 122 may then provide the data, received from the receiver system 108, to the application servers 118 and the broadcast servers 116. Alternatively, data received from the receiver system 108 may be directly provided to the application servers 118.

Accordingly, the network 126 and the I/O device 126 may operate as a return channel whereby the receiver system 108 is provided with interactivity with the source system 102. Data provided to the headend system 114 via the return channel may include, merely for example, user input to an interactive media application executed at the receiver system 108 or data that is generated by the receiver system 108 and communicated to the source system 102. The return channel may also provide a channel whereby programs, targeted advertisements/commercials, and applications from the source system 102 are provided to the receiver system 108.

Within the source system 102, the headend system 114 is also shown optionally to receive data (e.g., content, code, and application data) from external sources. For example, the headend system 114 may be coupled to one or more content sources 128 and one or more application sources 130 via a network 132 (e.g., the Internet). For example, a content source 128 may be a provider of entertainment content (e.g., movie), a provider of real-time dynamic data (e.g., weather information), and the like. The application source 130 may be a provider of any interactive media application. For example, one or more application sources 130 may provide a TV media player application, electronic program guide and navigation applications, messaging and communication applications, information applications, and so forth. The application sources 130 may be configured to execute on different client devices (e.g., mobile phones, personal computer, STBs, or the like).

Turning now to the example distribution system 104, the distribution system 104 may, in one embodiment, support the broadcast distribution of data from the source system 102 to the receiver system 108. As shown, the distribution network or system 104 may comprise a satellite, cable, terrestrial or Digital Subscribers Line (DSL) network, or any other data communication network or combination of such networks.

The receiver system 108 is shown, in one example embodiment, to include the set-top box (STB) 120 that receives data (e.g., primary and secondary content streams) via the distribution system 104 and modulator box 106 and an input/output device 132 (e.g., modem) for return channel communications with the headend system 114. The receiver system 108 is also shown to include other optional external systems such as a user input device 134 (e.g., a keyboard, remote control, mouse etc.) and a display device 136, coupled to the set-top box 120, for the display of content received at the set-top box 120. In one example embodiment, the display device 136 may be a television set.

The modulator box 106, in one example embodiment, receives stored data from the storage unit 110 and a broadcast transmission from the source system 102. The modulator box 106 multiplexes the stored data into the broadcast transmission thereby generating a second transmission that is communicated to the receiving system 108. It will, however, be appreciated that storage unit functionality is optional. The storage unit 110 may store data and, upon request, communicate the stored data to the modulator box 106 over the network 112 (e.g., Ethernet). The storage unit 110 may communicate the stored data in response to commands that are entered by a user from the set-top box 120 and communicated to the storage unit 110 over a link 138.

It will be appreciated to one skilled in the art that one or more of the modules, applications, or the like of the modulator box 106, the set-top box 120, and the storage unit 110 may be combined or integrated. In general, components, protocols, structures, and techniques not directly related to functions of example embodiments have not been shown or discussed in detail. The description given herein simply provides a variety of example embodiments to aid the reader in an understanding of the systems and methods used herein. While the interactive media environment 100 is illustrated having a receiving system 108 including a set-top box 120, it is noted that the receiving system 108 may comprise a mobile device or a personal computer coupled to a network for receiving media.

Smart playlist may be utilized beneficially in the context of a network environment. FIG. 1 illustrates an environment 100 within which an example smart playlist may be implemented. The environment 100 includes a set top box 110 in communication with an entertainment display device 120 and a control device 130. The set-top box (STB) 110 may be a device that connects to a television and an external source of signal, turning the signal into content which can then be displayed on the television screen. In one example embodiment, the entertainment display device 120 is a television set, and the control device 130 is a remote control device that may be used for switching between television channels, for example. The set-top box 110 may be configured to include a system 112 to provide a smart playlist that may include features outlined above. The set-top box 110 may be configured to receive content from sources such as, e.g., an Ethernet cable, a satellite dish, a coaxial cable, a telephone line (including digital subscriber line (DSL) connections), Broadband over Power Line, as well as very high frequency (VHF) or ultra high frequency (UHF) antenna. Content, in this context, could mean any or all of video, audio, Internet web pages, interactive games, or other possibilities. As shown in FIG. 1, the set-top box 110 is shown as having access to signal sources 140, including broadcast programming 142, video on demand programs 144, as well as to local content 146 and Internet content 148.

Figure 2:
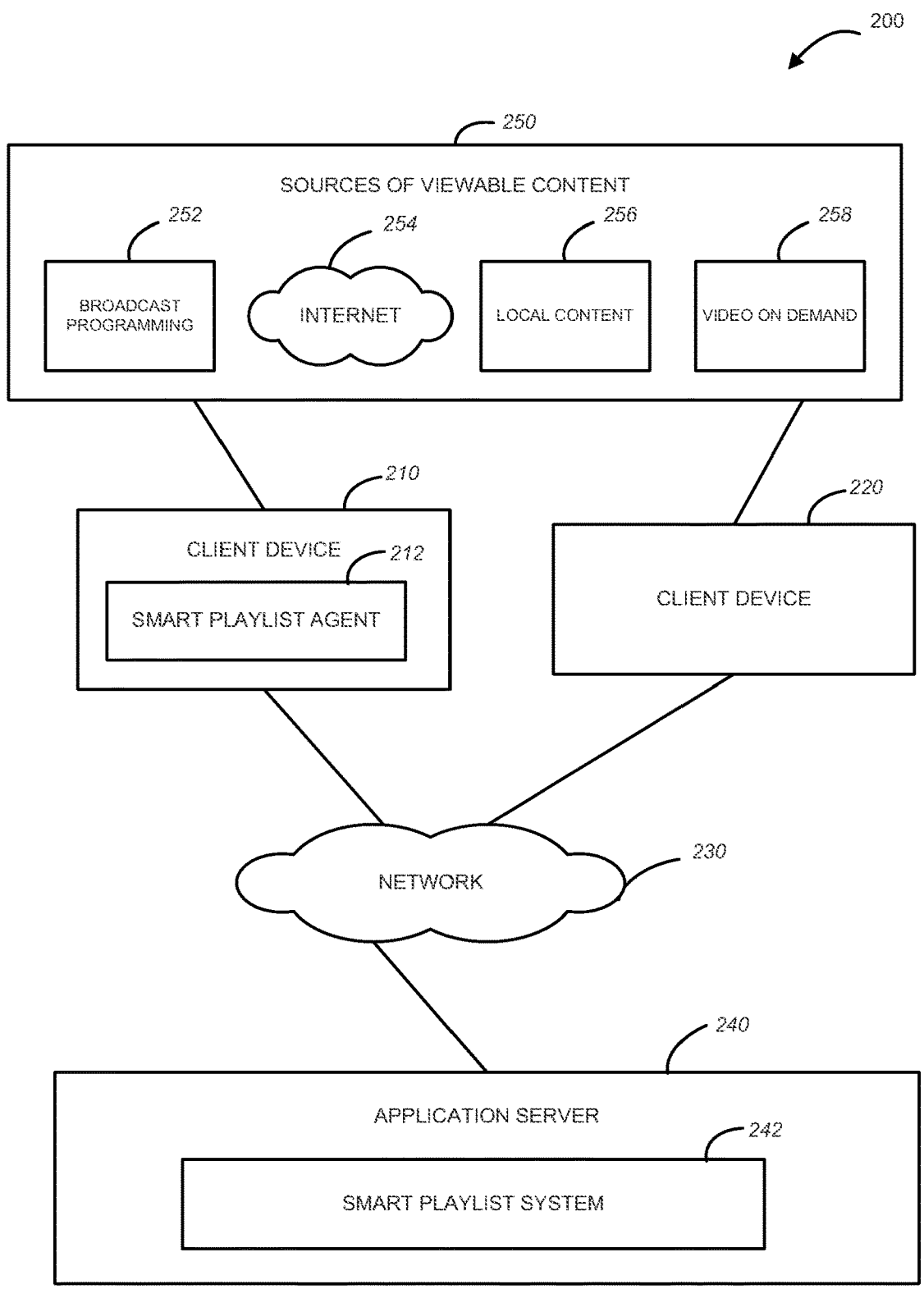
FIG. 2 is a network diagram illustrating architecture within which a smart playlist may be utilized, in accordance with an example embodiment.

FIG. 2 is a network diagram illustrating architecture 200 within which a smart playlist may be utilized, in accordance with an example embodiment. The architecture 100 includes a client device 210 and a client device 220, each configured to receive content from content sources 250 and to be in communication with a server system 240 via a communications network 230. The client devices 210 and 220 may be set top boxes, desktop computers, mobile devices, etc. The communications network 230 may be a public network (e.g., the Internet, a wireless network, etc.) or a private network (e.g., a local area network (LAN), a wide area network (WAN), Intranet, etc.). The server 240 may include a smart playlist system 242 configured to collect information related to utilization of viewable content from viewers' client devices, to aggregate and customize the collected information, and to provide the resulting hot list to viewers personalized for each particular user, as was described above.

The client device 210 may be configured to include a smart playlist agent 212 that may be configured to cooperate with the smart playlist system 242 with respect to collecting information regarding viewable content accessed or referenced on the client device 210. In some embodiments, the smart playlist system 242 may be configured to obtain information regarding viewable content accessed or referenced on a client device without the use of a smart playlist agent. As shown in FIG. 2, the client devices 210 and 220 have access to signal sources 250. The signal sources 250 include broadcast programming 252, video on demand programs 254, as well as to local content 256 and Internet content 258. An example system to generate a smart playlist may be described with reference to FIG. 2.

Figure 3:
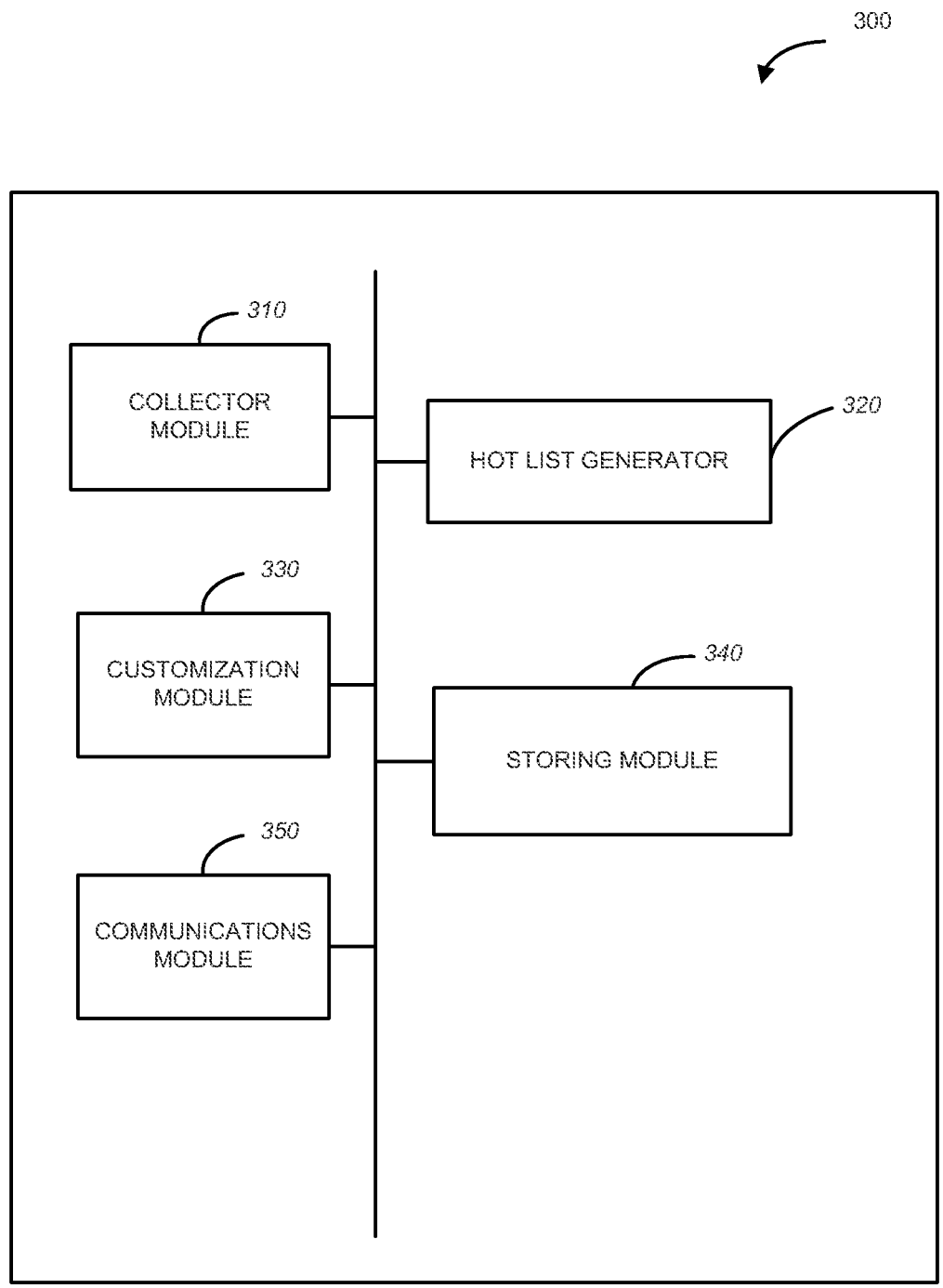
FIG. 3 is a block diagram illustrating a smart playlist system, in accordance with an example embodiment.

FIG. 3 illustrates an example system 300 to generate a smart playlist based on content utilization information collected from client devices of the entire community of users that can be accessed by the smart playlist system. The system 300 includes a collector module 310, a hot list generator 320, a customization module 340, and a communications module 350. The collector module 310 may be configured to obtain content utilization data from a plurality of client devices (e.g., the client devices 210 and 220 of FIG. 2. The content utilization data for a viewer from the plurality of viewers may be indicative of the viewer's interest in respective content items. In one embodiment, the collector module 310 obtains content utilization data from a real time listener provided at a client device, e.g., the smart playlist agent 212 of FIG. 2. The hot list generator 320 may be configured to generate a list of popular content items based on the obtained content utilization data.

The collector module 310 obtains content utilization information from all client devices accessible to the smart playlist system 300. This information, collected from the entire universe of viewers that have diverse tastes, viewing habits, and content source preferences and that reflects content utilization of the entire viewing community, is stored, by a storing module 340, in a repository termed a global bucket. The data from the global bucket is analyzed by the hot list generator 320 to determine those content items that are of most interest to the global community of viewers and assemble those content items into a list of popular items, a so-called hot list. In one embodiment, the hot list generator 320 may generate a hot list based on how many viewers are watching or recording a show, the duration of the watching, ratings and recommendations associated with the program, and so on. As the collector module 310 continuously obtains content utilization data from client devices, the hot list generator 320 may be configured to continuously update the hot list, e.g., once a day or based on any predetermined time period.

The customization module 330 may be configured to customize the hot list that is generated based on the information from the global bucket that reflect preferences of the entire community of viewers to target more closely the actual and projected preferences of a particular viewer (a target viewer) and generate a so-called customized playlist. The customizing may be based on the viewer's profile that may be stored at the application server 240 of FIG. 2, as well as on the viewing history of the viewer and the viewing history of members of the viewer's social network. In one embodiment, the storing module 340 stores content utilization data for individual viewers in respective repositories termed personal buckets. A viewer's profile stored at the application server 240 may indicate that one or more other viewers are associated with the viewers as "friends" in terms of social networking. The storing module 340 stores content utilization data collected from client devices of the viewer's "friends" or social connections in a repository termed a social bucket. The customization module 330 may utilize data from the viewer's personal bucket and the viewer's social bucket to generate the customized playlist. The customization module 330 may be configured to periodically update the customized playlist, e.g., based on the changes in the hot list, based on the changes in the data stored in the personal bucket and the social bucket, as well as based on the changes in the viewer's profile.

In one embodiment, a customized playlist is generated by generating a score for each item from the list of popular content items and including items into in the customized playlist based on respective scores of the items from the list of popular content items. The scoring may be based on the viewer's preferences identified in the viewer's profile, based on data from the viewer's personal bucket and the viewer's social bucket. A content item from a category that is not indicated in the viewer's profile as being of interest to the viewer and that is not considered as being of interest to the viewer based on the viewing history of the viewer may still be assigned a high score by the customization module 330 based on the information from the viewers social bucket. For example, the customization module 330 may be configured to weigh heavily an indication that a certain content item is of high interest to a great number of the viewer's social contacts.

The communications module 350 may be configured to communicate the customized playlist to a client device of the target viewer. The communications module 350 may be configured to communicate to the client device an instruction to start recording of a live program identified in the customized playlist. The communications module 350 may also be configured to communicate to the client device an instruction to display an alert message regarding of a live program identified in the customized playlist. As mentioned above, a client device may be a set top box, a desktop computer, or a mobile device. Content items referenced in the hot list or in the customized playlist may be associated with a variety of content sources, such as, e.g., the Internet, video on demand, and live broadcast. Example operations performed by the system 400 may be described with reference to FIG. 4.

Figure 4:
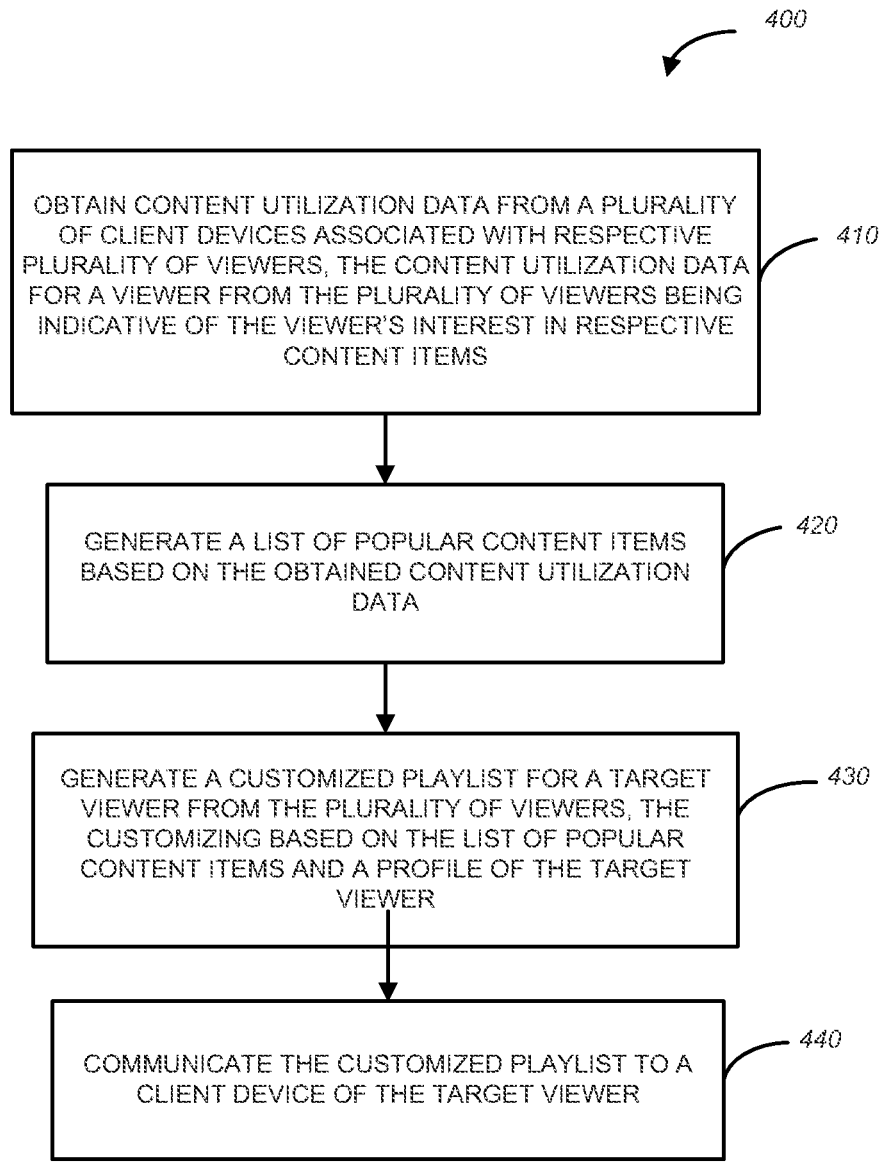
FIG. 4 is a flow chart illustrating a method for providing a smart playlist to a viewer's client device, in accordance with an example embodiment.

FIG. 4 illustrates an example method 400 of providing a smart playlist. The method 400 may be performed in the context of media and entertainment, e.g., in the context of television entertainment. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 3.

As shown in FIG. 4, the method 400 commences with operation 410, where the collector module 310 of FIG. 3 obtains content utilization data from a plurality of client devices associated with respective plurality of viewers. At operation 420, the hot list generator 320 of FIG. 3 generates a list of popular content items based on the obtained content utilization data. At operation 430, the customization module 330 of FIG. 3 generates a customized playlist for a target viewer from the plurality of viewers, based on the list of popular content items and a profile of the target viewer. At operation 440, the communications module 340 of FIG. 3 communicates the customized playlist to a client device of the target viewer.

Figure 5:
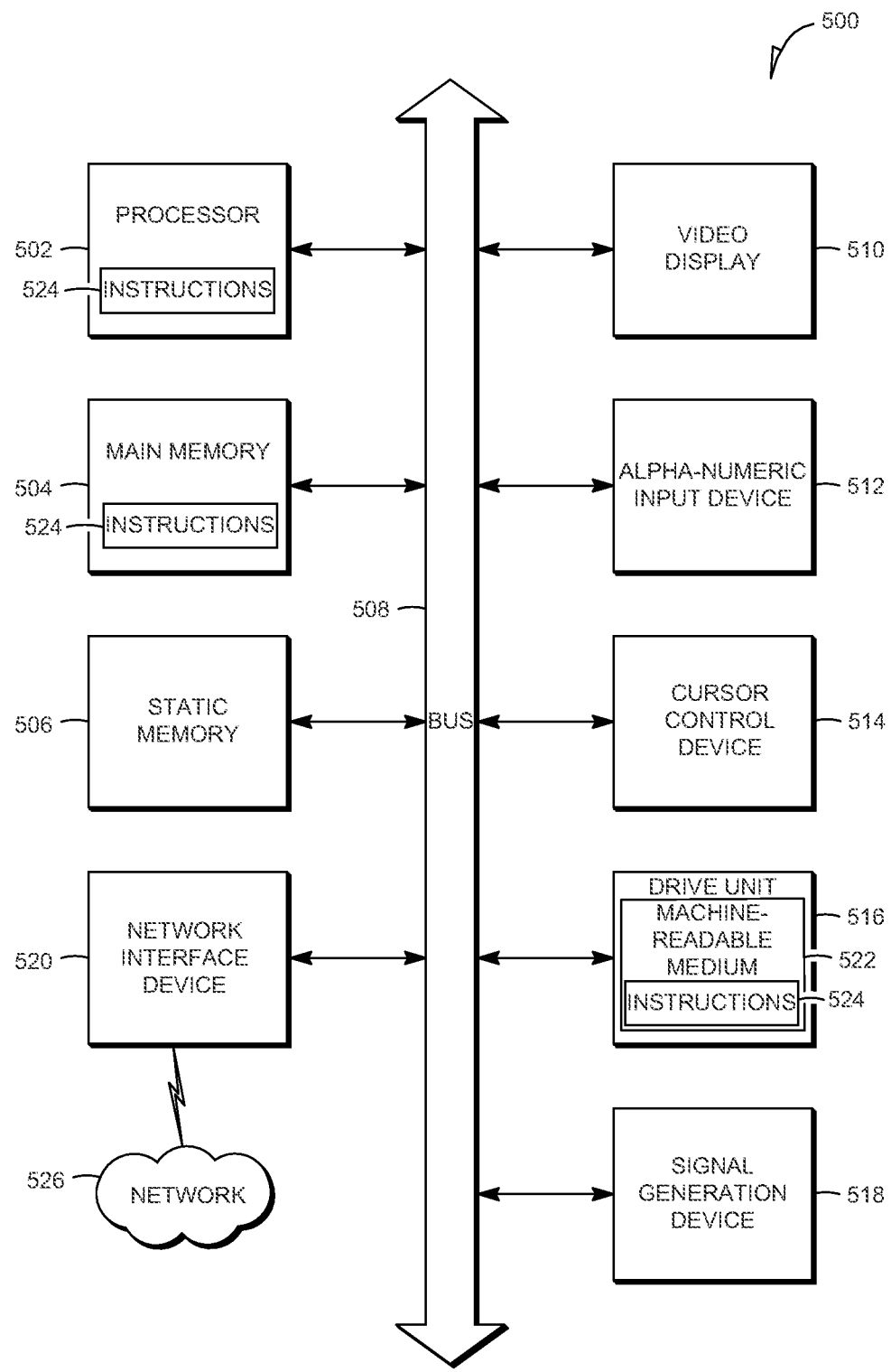
FIG. 5 illustrates a diagrammatic representation of a machine in the example form of a computer system within which a set of instructions, for causing the machine to perform any one or more of the methodologies discussed herein, may be executed.

FIG. 5 shows a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a real or virtual keyboard), a viewer interface (UI) navigation device 514 (e.g., a remote control or a mouse), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504, within the processor 502 during execution thereof by the computer system 500, the main memory 504 and the processor 502 also constituting machine-readable media. The main memory 504 comprises storage locations that are addressable by the processor 502 for storing software program code. The memory may comprise a form of random access memory (RAM). Those skilled in the art will appreciate that other memory means, such as FLASH memory media, may also be used for storing the program instructions and data structures shown in the main memory 504.

The software 524 may further be transmitted or received over a network 526 via the network interface device 520 utilizing any one of a number of well-known transfer protocols (e.g., HTTP).

While the machine-readable medium 522 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium (e.g., FLASH memory media) that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The embodiments described herein may be implemented in an operating environment comprising software installed on a computer, in hardware, or in a combination of software and hardware.

Thus, method and system to generate and update a smart playlist have been described. In the description above, for purposes of explanation, numerous specific details have been set forth in order to provide a thorough understanding of one example embodiment. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any viewer of the system to navigate television content.

The invention claimed is:

1. A computer-implemented method comprising:
accessing a database to obtain content utilization data of a plurality of client devices, each client device associated with a respective viewer of a plurality of viewers, wherein the content utilization data for a first viewer from the plurality of viewers is indicative of an interest of the first viewer in respective content items, and wherein the plurality of viewers comprises a second viewer who is not identified as a social connection of the first viewer;
automatically generating, by a computer system, a list of popular content items that are currently popular among the plurality of viewers based on the content utilization data;
customizing, by the computer system, the list of popular content items to generate a playlist, the customizing based on profile data of the first viewer , wherein the customizing is performed by the computer system and comprises:
generating a score for each item from the list of popular content items based on the profile data of the first viewer; and
including items in the playlist based on at least some of the scores of the items from the list of popular content items; and
based on the generating of the playlist, automatically sending, by the computer system, to a client device of the first viewer, an instruction that causes the client device to perform an operation for an item of the items included in the playlist.
2. The method of claim 1, wherein the customizing of the list of popular content items to generate the playlist is further based on viewing history data of at least one viewer who is identified in social connection data as a social connection of the first viewer.
3. The method of claim 2, wherein the generating of the score for each item from the list of popular content items is further based on the viewing history data of the at least one viewer who is identified in the social connection data as a social connection of the first viewer.
4. The method of claim 2, wherein the customizing comprises selecting at least one of the popular content items for the playlist based on the viewing history data of the at least one viewer who is identified in the social connection data as a social connection of the first viewer indicating a high level of interest in the at least one of the popular content items while viewing history data of the first viewer indicates a low level of interest in the at least one of the popular content items by the first viewer.
5. The method of claim 1, further comprising:
communicating the playlist to a client device of the first viewer.
6. The method of claim 1, wherein the sending of the instruction that causes the client device to perform the operation for the item of the items included in the playlist comprises sending an instruction that causes initiation of recording of a live program identified in the playlist.
7. The method of claim 1, wherein the sending of the instruction that causes the client device to perform the operation for the item of the items included in the playlist comprises sending an instruction that causes display of an alert message regarding a live program identified in the playlist.
8. The method of claim 1, wherein the items in the playlist include at least one of a first item that identifies Internet content, a second item that identifies video on demand content, and a third item that identifies a live program.
9. The method of claim 1, wherein the client device comprises a set top box.
10. The method of claim 1, wherein the client device comprises a desktop computer.
11. The method of claim 1, wherein the client device comprises a mobile device.
12. The method of claim 1, wherein the customizing of the list of popular content items is also based at least in part on a content category of interest to the first viewer.
13. The method of claim 1, wherein the content utilization data indicates lengths of time during which the plurality of viewers have viewed a content item.
14. A system comprising:
a memory that stores instructions; and
one or more processors configured by the instructions to perform operations comprising:
accessing a database to obtain content utilization data of a plurality of client devices associated with a plurality of viewers, wherein the content utilization data for a first viewer from the plurality of viewers is indicative of an interest of the first viewer in respective content items, and wherein the plurality of viewers comprises a second viewer who is not identified as social connections of the viewer;
automatically generating a list of popular content items that are currently popular among the plurality of viewers based on the content utilization data;
generating a playlist by performing customization operations comprising:
generating a score for each item from the list of popular content items based on a profile of the first viewer; and including items in the playlist based on respective scores of the items from the list of popular content items; and based on the generating of the playlist, automatically sending, to a client device of the first viewer, an instruction that causes the client device to perform an operation for an item of the items included in the playlist.

15. The system of claim 14, wherein the generating of the playlist is further based on viewing history data of at least one viewer who is identified in social connection data as a social connection of the first viewer.

16. The system of claim 15, wherein the generating of the score for each item from the list of popular content items is further based on viewing history data of the at least one viewer who is identified in social connection data as social connections of the first viewer.

17. The system of claim 15, wherein the customization operations further comprise selecting at least one of the popular content items for the playlist based on viewing history data of the at least one viewer who is identified in social connection data as social connections of the first viewer indicating a high level of interest in the at least one of the popular content items while viewing history data of the first viewer indicates a low level of interest in the at least one of the popular content items by the first viewer.

18. The system of claim 14, wherein the operations further comprise:

communicating the playlist to a client device of the first viewer.

19. The system of claim 14, wherein the sending of the instruction that causes the client device to perform the operation for the item of the items included in the playlist comprises sending an instruction that causes initiation of recording of a live program identified in the playlist.

20. A machine-readable non-transitory storage medium storing instructions that, when executed by one or more processors of a machine, cause the machine to perform operations comprising:

accessing a database to obtain content utilization data of a plurality of client devices, each client device associated with a respective viewer of a plurality of viewers, wherein the content utilization data for a first viewer of the plurality of viewers is indicative of an interest of the first viewer in respective content items, and wherein the plurality of viewers comprises a second viewer who is not identified as a social connection of the viewer;

automatically generating a list of popular content items that are currently popular among the plurality of viewers based on the content utilization data;

generating a playlist , the generating of the playlist being based on the list of popular content items and profile data of the first viewer, wherein the generating of the playlist comprises:

generating a score for each item from the list of popular content items based on the profile data of the first viewer; and including items in the playlist based on at least some of the scores of the items from the list of popular content items; and based on the generating of the playlist, automatically sending, to a client device of the first viewer, an instruction that causes the client device to perform an operation for an item of the items included in the playlist.

* * * * *